United States Patent [19]

Jonner

[11] Patent Number: 5,322,355
[45] Date of Patent: Jun. 21, 1994

[54] ANTI-SKID BRAKE CONTROL SYSTEM

[75] Inventor: Wolf-Dieter Jonner, Beilstein, Fed. Rep. of Germany

[73] Assignee: Robert Bosch GmbH, Stuttgart, Fed. Rep. of Germany

[21] Appl. No.: 423,414

[22] PCT Filed: Feb. 23, 1988

[86] PCT No.: PCT/EP88/00132
§ 371 Date: Dec. 11, 1992
§ 102(e) Date: Dec. 11, 1992

[87] PCT Pub. No.: WO88/07465
PCT Pub. Date: Oct. 6, 1988

[30] Foreign Application Priority Data

Apr. 1, 1987 [DE] Fed. Rep. of Germany ....... 3710869

[51] Int. Cl.⁵ .............................................. B60T 8/32
[52] U.S. Cl. ...................................... 303/95; 303/100; 303/110; 364/426.02; 180/197
[58] Field of Search .................. 303/93, 94, 95, 97, 303/100, 104, 105, 110, 111, 113.5; 364/426.02, 426.03; 180/197

[56] References Cited

U.S. PATENT DOCUMENTS

| Re. 31,383 | 9/1983 | Leiber et al. | 303/110 X |
| 3,702,206 | 11/1972 | Sweet | 303/111 |
| 3,740,103 | 6/1973 | Sweet et al. | 303/110 |
| 4,491,919 | 1/1985 | Leiber | 303/100 X |
| 4,499,543 | 2/1985 | Matsuda | 303/110 X |
| 4,626,040 | 12/1986 | Ogino | 303/111 X |
| 4,848,851 | 7/1989 | Kuraoka et al. | 303/100 |

FOREIGN PATENT DOCUMENTS

| 106112 | 9/1983 | European Pat. Off. . |
| 2137646 | 12/1972 | France . |
| 2523055 | 9/1983 | France . |

OTHER PUBLICATIONS

Systeme antiblocage avec fonctions elargies No. 7, Oct. 1984 pp. 110-116.

Primary Examiner—Robert J. Oberleitner
Assistant Examiner—Peter M. Poon
Attorney, Agent, or Firm—Felfe & Lynch

[57] ABSTRACT

An anti-skid brake control system is described which recognizes a driving condition in which it is not possible to sufficiently brake the vehicle. The braking effect can be improved by switching off the anti-skid brake control system for the front wheels and/or at least reducing the driving torque acting on the driven rear wheels.

19 Claims, 1 Drawing Sheet

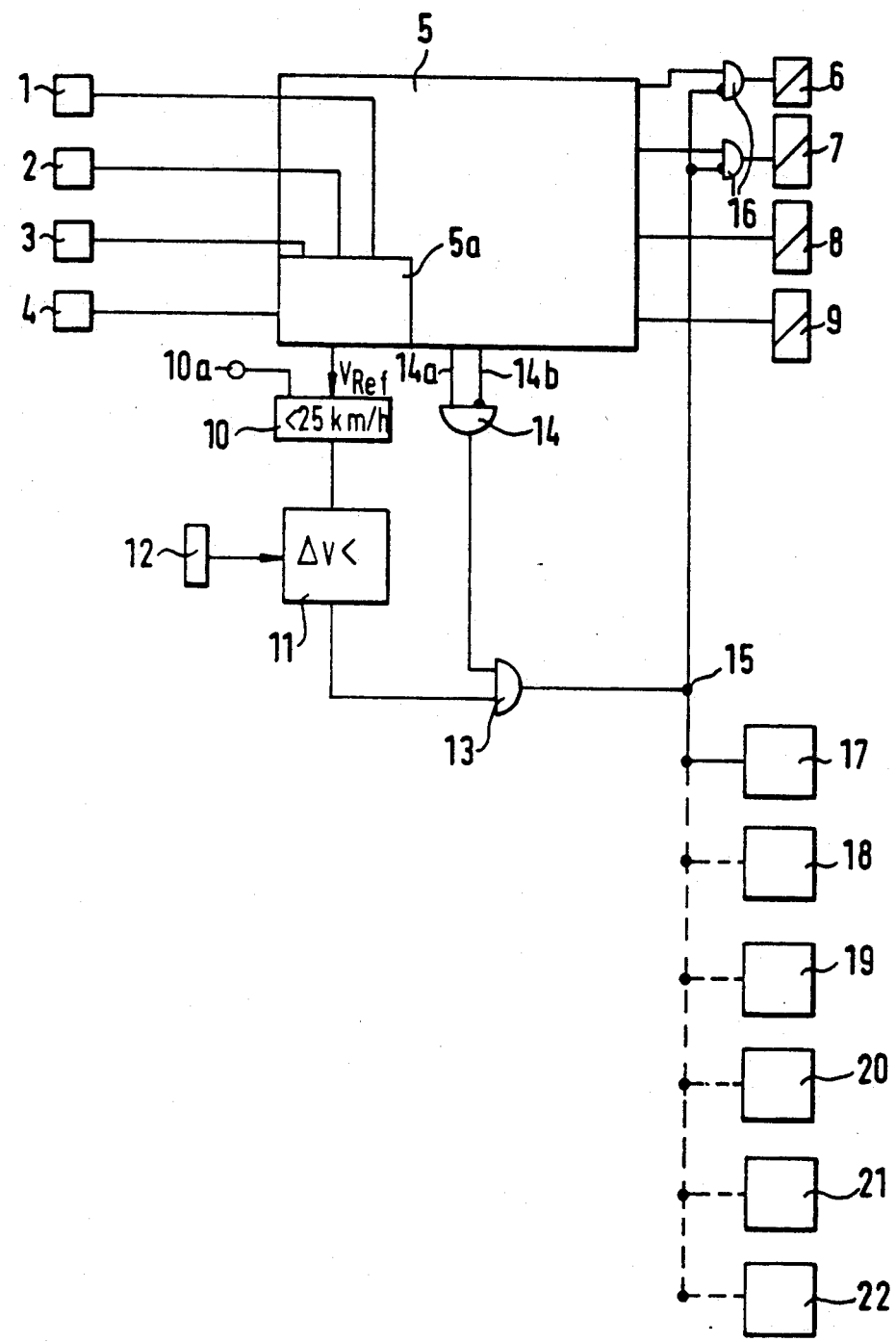

ANTI-SKID BRAKE CONTROL SYSTEM

BACKGROUND OF THE INVENTION

The invention relates to an anti-skid brake control system for a motor vehicle having forward and rearward sets of vehicle wheels, at least one of which is driven. The anti-skid brake control system includes speed sensors associated with the vehicle wheels; an evaluation circuit responsive to the wheel speed sensors for producing brake pressure control signals; and brake pressure control means for controlling the brake pressure applied to the vehicle wheels in response to the control signals.

At a low friction coefficient, and this applies especially to a rear wheel driven vehicle, there is a situation in which, during the control of a pressure level corresponding to the locking limit of the front wheels, the momentary balance at the rear axle between braking torque and driving torque—especially at a high idle speed during cold operation—results in a positive driving torque. A consequence thereof is that the vehicle does not come to complete stop despite a locking of the front wheels. A stopping of the vehicle is only possible when the brake pressure is increased to a value which exceeds the motor driving torque. This requires in some cases significant brake pressures and hence high pedal forces.

This situation can be intensified with the combination of an anti-skid brake control system based on the feedback principle and a vacuum brake power booster. When the energy consumed by the pressure modulation is not sufficiently replaced and when the throttle is partially open, the level control point of the booster continuously decreases. In this case the foot pressure required for reaching a sufficient pressure level to surpass the driving torque increases to values which cannot be reached in borderline cases.

The above described problems can result in a situation in which a vehicle—especially with rear drive—cannot be stopped on a slippery road even when great pedal forces are applied unless the driver disengages the clutch or sets the shift lever of an automatic transmission to "neutral". However, especially in case of an automatic transmission, such a reaction cannot be expected by a driver in a "stress situation".

SUMMARY OF THE INVENTION

It is an object of the invention to configure an anti-skid brake control system such that the above described problems are avoided.

This object, as well as other objects which will become apparent from the description that follows, are achieved, in accordance with the present invention, by providing the anti-skid brake control system with a device for determining whether the speed decrease of a non-driven wheel falls below a prescribed small value within prescribed periods of time during activation of the brake pressure control, and a device responsive to the determining device for effecting at least one of the following:

(1) disabling the anti-skid brake control function of at least the non-driven wheel set, and (2) reducing the driving torque on the driven wheel set.

For a full understanding of the present invention, reference should now be made to the following detailed description of the preferred embodiments of the invention and to the accompanying drawing.

BRIEF DESCRIPTION OF THE DRAWING

The only figure illustrates an embodiment of an anti-skid brake control system in accordance with the invention represented as a block diagram.

DESCRIPTION OF THE PREFERRED EMBODIMENTS

The anti-skid brake control system includes shown in the figure four speed sensors 1 to 4 for the wheel speeds which are assigned to the front wheels (1 and 2) and the driven rear wheels (3 and 4). The signals thereof are supplied to an evaluation circuit as it is commonly known. From the supplied speed sensor signals this circuit generates brake pressure control signals for the brake pressure control devices 6 to 9, represented as solenoid valves, so as to vary the brake pressure at the front wheels (valves 6 and 7) and the rear wheels (valves 8 and 9).

The evaluation circuit 5 includes a block 5a here the reference speed $V_{Ref}$ (a speed curve approximated to the vehicle speed) required for the slippage control is generated from the wheel speed signals as commonly known. This reference speed $V_{Ref}$ is brought out from the evaluation circuit 5 and supplied to a comparator 10 to which is also supplied a comparison value (e.g. 25 km/h) through a terminal 10a. The comparator 10 passes signals which correspond to speed values <25 km/h and supplies these signals to a circuit element 11. This circuit receives pulses at intervals T from a pulse generator 12 and checks at each interval T whether the speed decrease $\Delta v$ is less than a prescribed vehicle deceleration of, for example, 0.05 g.

If this is the case it releases a control signal. However, this signal can only fulfill its control function if it is passed through an AND-gate 13. This is the case if an AND-gate 14 produces an output which, in turn, is the case when it receives an input via line 14a indicating that the control portion which is associated with the non-driven front wheels is activated and when it receives a "0" input via line 14b indicating that the control portion associated with rear wheels is not in operation.

The control signal thus reaches the circuit point 15 when the reference speed $V_{Ref}$ is under 25 km/h, when it decreases by only a relatively small value and only when at least one of the non-driven front wheels is controlled by the anti-skid brake control system and neither of the rear wheels is controlled.

In this case either 1. the anti-skid function of the non-driven axle, so long as it is the front axle, is switched off via AND-gate 16;

2. and/or the fuel cut-off (block 17) is activated while by-passing the motor speed dependence; 3. and/or the engine ignition and/or the fuel injection is interrupted (blocks 18, 19);

4. and/or the ignition timing is retarded by the highest possible value (block 20);

5. and/or in the case of a conventional clutch and gear shift the motor is automatically decoupled by an electrically/hydraulically actuated clutch (block 21);

6. and/or an automatic transmission is electrically or hydraulically set to "neutral" or electrically or hydraulically set to the highest possible gear (block 22)

These measures, once taken, remain effective until the vehicle is stopped or the brake is released.

The advantage of the invention is the monitoring of a critical driving condition during which the vehicle cannot be stopped by means of the pedal force applied and during which a high amount of energy is consumed by the brake power booster.

There has thus been shown and described a novel anti-skid brake control system which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

What is claimed is:

1. In an anti-skid brake control system for a motor vehicle having forward and rearward sets of vehicle wheels, which sets are separately controlled, and means for driving one wheel set, said system comprising:
   (a) a plurality of wheel speed sensors associated with the vehicle wheels for producing wheel speed signals;
   (b) evaluation circuit means responsive to said wheel speed signals for producing brake pressure control signals; and
   (c) brake pressure control means for controlling the brake pressure applied to the vehicle wheels in response to said control signals;
   the improvement comprising means for determining whether the decrease of vehicle speed derived from the wheel speed signals falls below a prescribed, small value within prescribed periods of time during activation of said brake pressure control means of at least one non-driven wheel and neither driven wheel; and means responsive to said determining means for effecting at least one of:
   (1) disabling the anti-skid brake control function on at least the non-driven wheel set, and
   (2) reducing the driving torque on the driven wheel set.

2. The anti-skid brake control system defined in claim 1, wherein said means for disabling the anti-skid brake control function disables the function on only the non-driven wheel set.

3. The anti-skid brake control system defined in claim 1, wherein said determining means monitors said speed decrease only when the vehicle speed is below a prescribed threshold.

4. The anti-skid brake control system defined in claim 3, wherein said evaluation circuit means includes means, responsive to said wheel speed sensors, for producing a vehicle reference speed signal, and means for comparing individual wheel speed signals with said reference speed signal to determine wheel slippage; and wherein said determining means is responsive to said vehicle reference speed signal to determine when the vehicle speed, represented by said reference speed signal, falls below said prescribed threshold.

5. The anti-skid brake control system defined in claim 1, wherein said means for reducing the driving torque on the driven wheel set includes means for actuating the vehicle fuel cut-off.

6. The anti-skid brake control system defined in claim 1, wherein said means for reducing the driving torque on the driven wheel set includes means for interrupting the vehicle engine ignition.

7. The anti-skid brake control system defined in claim 1, wherein said means for reducing the driving torque on the driven wheel set includes means for interrupting the engine fuel injection.

8. An anti-skid brake control system for a motor vehicle having forward and rearward sets of wheels, one of said sets being driven and one of said sets being non-driven, said system comprising
   wheel speed sensors for producing wheel speed signals for respective said wheels,
   evaluation circuit means for producing a vehicle speed and brake pressure control signals from said wheel speed signals,
   means for controlling brake pressure at the wheels in response to said brake pressure control signals,
   means for determining when said vehicle speed during a prescribed time interval undergoes a decrease which is less than a prescribed deceleration value,
   means for determining when at least one of said non-driven wheels is controlled and neither driven wheel is controlled by said means for controlling brake pressure, and
   means for at least one of (1) switching off said means for controlling brake pressure at least at said non-driven wheels, and (2) reducing driving torque on the driven wheels, when said decrease in vehicle speed during a prescribed time interval is less than said prescribed deceleration value and at least one of said non-driven wheels is controlled and neither driven wheel is controlled by said means for controlling brake pressure.

9. An anti-skid brake control system as in claim 8 wherein said means for controlling brake pressure at said non-driven wheels is switched off when said decrease in vehicle speed during a prescribed time interval is less than said prescribed deceleration value and at least one of said non-driven wheels is controlled and neither driven wheel is controlled by said means for controlling brake pressure.

10. An anti-skid control system as in claim 9 wherein said means for controlling brake pressure at only said non-driven wheels is switched off when said decrease in vehicle speed during a prescribed time interval is less than said prescribed deceleration value and at least one of said non-driven wheels is controlled and neither driven wheel is controlled by said means for controlling brake pressure.

11. An anti-skid control system as in claim 8 further comprising means for determining when said vehicle speed is below a prescribed threshold, said vehicle speed decrease only being determined when said vehicle speed is below said threshold.

12. An anti-skid control system as in claim 8 wherein said drive torque on the driven wheels is reduced when said decrease in vehicle speed during a prescribed time interval is less than said prescribed deceleration value and at least one of said non-driven wheels is controlled and neither driven wheel is controlled by said means for controlling brake pressure.

13. An anti-skid control system as in claim 8 wherein said means for reducing drive torque comprises at least one of
   means for cutting off fuel supply,
   means for interrupting ignition,
   means for retarding ignition,
   means for interrupting fuel injection, means decoupling the engine from the driven wheels, and means for setting an automatic transmission in the highest gear.

14. Method for controlling skidding in a motor vehicle having forward and rearward sets of wheels, one of said sets being driven and one of said sets being non-driven, said method comprising the steps of producing wheel speed signals for respective said wheels, producing a vehicle speed and brake pressure control signals from said wheel speed signals, controlling brake pressure at the wheels in response to said brake pressure control signals, determining when said vehicle speed during a prescribed time interval undergoes a decrease which is less than a prescribed deceleration value, determining when at least one of said non-driven wheels is controlled and neither of said driven wheels is controlled in response to said brake pressure control signals, and at least one of (1) discontinuing control of brake pressure in response to said brake pressure control signals at least at said non-driven wheels, and (2) reducing drive torque on the driven wheels, when said decrease in vehicle speed during a prescribed time interval is less than said prescribed deceleration value and at least one of said non-driven wheels is controlled and neither driven wheel is controlled in response to said brake pressure control signals.

15. Method as in claim 14 comprising discontinuing control of brake pressure in response to said brake pressure control signals at least at said non-driven wheels when said decrease in vehicle speed during a prescribed time interval is less than said prescribed deceleration value and at least one of said non-driven wheels is controlled and neither driven wheel is controlled in response to said brake pressure control signals.

16. Method as in claim 14 comprising discontinuing control of brake pressure in response to said brake pressure control signals only at said non-driven wheels when said decrease in vehicle speed during a prescribed time interval is less than said prescribed deceleration value and at least one of said non-driven wheels is controlled and neither driven wheel is controlled in response to said brake pressure control signals.

17. Method as in claim 14 further comprising determining when said vehicle speed is below a prescribed threshold, said vehicle speed decrease only being determined when said vehicle speed is below said threshold.

18. Method as in claim 14 comprising reducing drive torque on the driven wheels, when said decrease in vehicle speed during a prescribed time interval is less than said prescribed deceleration value and at least one of said non-driven wheels is controlled and neither driven wheel is controlled in response to said brake pressure control signals.

19. Method as in claim 18 wherein said reducing drive torque comprises at least one of cutting off fuel supply,
interrupting ignition,
retarding ignition,
interrupting fuel injection,
decoupling the engine from the driven wheels, and
setting an automatic transmission in highest gear.

* * * * *